United States Patent [19]

Sato et al.

[11] Patent Number: 5,327,782

[45] Date of Patent: Jul. 12, 1994

[54] AUTOMATIC BRAKE SHOE MEASURING APPARATUS FOR ROLLING STOCK

[75] Inventors: Hitoshi Sato; Shigetoshi Adachi; Hisao Nishii; Takehiro Yazaki; Osamu Tashiro; Noboru Yumoto; Sumio Kanazawa; Hiroshi Arai, all of Chiyoda; Makoto Miyake, Komaki, all of Japan

[73] Assignee: Kawasaki Steel Corporation, Hyogo, Japan

[21] Appl. No.: 955,727

[22] PCT Filed: Mar. 31, 1992

[86] PCT No.: PCT/JP92/00397

§ 371 Date: Dec. 21, 1992

§ 102(e) Date: Dec. 21, 1992

[87] PCT Pub. No.: WO93/05358

PCT Pub. Date: Mar. 18, 1993

[30] Foreign Application Priority Data

Sep. 9, 1991 [JP] Japan ............... 3-229058

[51] Int. Cl.[5] ............... B61H 11/00; G01B 11/04; G01L 5/28; H04N 7/18
[52] U.S. Cl. ............... 73/129; 340/454; 356/381; 348/142
[58] Field of Search ............... 73/121, 129; 340/454, 340/453; 358/107; 356/379, 381, 383, 384

[56] References Cited

U.S. PATENT DOCUMENTS

| | | | |
|---|---|---|---|
| 3,685,012 | 8/1972 | Case et al. | 358/107 |
| 4,687,107 | 8/1987 | Brown et al. | 358/107 |
| 4,693,378 | 9/1987 | Azegami et al. | 358/107 |
| 4,866,642 | 9/1989 | Obrig et al. | 356/384 |
| 5,007,739 | 4/1991 | Shimano et al. | 356/383 |
| 5,018,211 | 5/1991 | Jaffe et al. | 358/107 |
| 5,038,605 | 8/1991 | Tews et al. | 73/129 |
| 5,083,200 | 1/1992 | Deffontaines | 358/107 |
| 5,200,792 | 4/1993 | Tajima et al. | 358/107 |

FOREIGN PATENT DOCUMENTS

| | | |
|---|---|---|
| 61-3005 | 1/1986 | Japan . |
| 61-167841 | 7/1986 | Japan . |
| 63-120248 | 5/1988 | Japan . |

OTHER PUBLICATIONS

Description of "Digicol Model 402", by International Imaging Systems, May 9, 1975.
Description of "Model 420 Video Micrometer", by Spatial Data Systems, Jan. 1972.

Primary Examiner—Hezron E. Williams
Assistant Examiner—George Dombroske
Attorney, Agent, or Firm—Oliff & Berridge

[57] ABSTRACT

An automatic brake shoe measuring apparatus for rolling stock automatically measures the thickness of brake shoes of a vehicle and automatically detecting the presence or absence of damage during travel. The automatic measuring apparatus includes: a camera unit including a monitor camera for photographing brake shoes of a vehicle during travel and outputting an image signal, an image memory for storing the image signal, and a trigger detector for outputting a trigger signal to thereby store an image signal representing an image of a specific brake shoe of the vehicle; and an image processing unit including an extraction means for extracting the specific brake shoe in accordance with the image signal stored in the image memory and transferred from the camera unit, an arithmetic means for calculating the thickness of the specific brake shoe extracted by the extraction means, and a display means for displaying the thickness of the specific brake shoe calculated out by the arithmetic means.

15 Claims, 9 Drawing Sheets

AUTOMATIC BRAKE SHOE MEASURING APPARATUS FOR ROLLING STOCK

TECHNICAL FIELD

The present invention relates to a brake shoe measuring apparatus for rolling stock which automatically detects the thickness, or amount of wear, of a brake shoe of a running vehicle.

BACKGROUND ART

The brake shoe used on the vehicle is a brake part which is pressed into direct contact with a tread of a wheel or with a disk sliding surface to apply a braking power to the vehicle.

FIG. 13 is a typical drawing showing one example of a brake shoe of rolling stock.

In FIG. 13, a wheel 20 mounted on a bogie frame 23 is rotating on a rail surface 22. A brake shoe 21 for the wheel tread is mounted also on the bogie frame 23 through a holder 27. This brake shoe 21 for the wheel tread is pressed against the tread of the wheel 20 at the time of brake application to the vehicle.

FIG. 14 is a typical drawing showing another example of the brake shoe for the vehicle.

In FIG. 14, a disc 25 rotating together with the wheel 20 is mounted on an axle 24 which connects two wheels 20 placed on two rails. On either side of this disc 25 is provided a brake shoe 26 for the disc. When the brake is applied, the disc 25 rotating together with the axle 24 is held by a brake shoe 26 for the disc, thereby applying the brake to the vehicle.

The brake shoe 21 for the wheel tread (see FIG. 13) and the brake shoe 26 for the disc (see FIG. 14) are gradually worn to decrease in thickness t during brake application, and will require replacement for safety when worn away to specific limit thickness (wear limit value). In the event of abnormal brake application, the brake shoes will be subjected to abnormal wear. To check the wears described above, the prior-art technique has such a disadvantage that a checker goes around the vehicle which is at a stop to make visual checks of a worn condition of the brake shoes. Replacement of the brake shoe, when found necessary, will be carried out at this point of time.

Also the prior-art technique has such a problem that since the thickness and a worn condition of the brake shoes are detected by the above method, much time and work is required and the brake shoes are replaced at the time when the necessity of their replacement is found. The above-described method of brake shoe replacement, however, is not systematic and besides because the check is visually performed, it is difficult to properly control data concerning the thickness and worn condition of the brake shoes.

DISCLOSURE OF THE INVENTION

To eliminate the above and other disadvantages of prior techniques the present invention has an object to provide an automatic brake shoe measuring apparatus for rolling stock which is capable of automatically detecting the thickness or the presence or absence of wear of the brake shoes of a running vehicle.

The automatic brake shoe measuring apparatus for rolling stock of the present invention for accomplishing the aforementioned object has a camera unit which comprises a monitor camera for photographing the brake shoes of the vehicle during travel and outputting an image signal (i.e. video signal or image data), an image memory for storing the image signal, a sensor which responds to the passage of the vehicle by specific positions on tracks, and a trigger detector which outputs a trigger signal so that an image signal representing the image of a specific brake shoe of the aforesaid vehicle will be stored in the image memory in accordance with a signal received from the sensor; and an image processing unit which comprises an extraction means for extracting the aforesaid specific brake shoe from the image signal stored in the image memory and transferred from the camera unit, an arithmetic means for determining the thickness of the specific brake shoe extracted by the extraction means, and a display means which displays the thickness of the specific brake shoe determined by the arithmetic means.

In this case, there may be provided a light source which emits flashing light to a specific brake shoe the instant that the camera unit photographs the specific brake shoe in accordance with the trigger signal inputted to the camera unit.

Also the image processing unit mentioned above may be provided with an input means for inputting information to specify a vehicle equipped with brake shoes to be photographed by the monitor camera. Furthermore there may be provided a memory means for storing the history of thickness of each brake shoe demanded by the image processing unit, a decision means for deciding whether the thickness of the specific brake shoe found by the arithmetic means is greater or less than a specific wear limit value, and furthermore a warning means for giving a warning in case the thickness of the specific brake shoe is less than the specific wear limit value, in place of, or together with, the display means previously stated.

Since the present invention includes the aforesaid camera unit and image processing unit as described above, it is possible to take the image of the brake shoe by the camera unit when the brake shoe for the wheel tread of the vehicle or the brake shoe for the disc passes within the field of view of the monitor camera, and to extract the brake shoe area to detect the thickness of the brake shoe, or the presence or absence of the degree of wear, by discriminating for example the density level or color of an image at the image processing unit.

The sensor for sensing that the vehicle equipped with the automatic measuring apparatus of the present invention has passed a fixed point on a track suffices if it can be installed at a fixed point along the track, and has a function to detect the passage of a specific area of the vehicle through a specific point on the track and to output a signal to the trigger detector, and also if it can output the signal to the trigger detector from the time when the specific area of the vehicle passes the specific position on the track till the time when or before the brake shoe at the head of the vehicle comes into the angle of view of the monitor camera. For example, the sensor may be chosen from among photoelectric sensors, ultrasonic sensors, eddy-current sensors, magnetic sensors and mechanical sensors.

It is desirable that, as the aforesaid specific area of the vehicle, an area located close to a brake shoe to be photographed, for example a wheel and the head of the vehicle be selected.

A vehicle number reader which reads the serial vehicle number affixed on each vehicle may be used as the sensor. The vehicle number reader is set at the upstream side of travel of the vehicle along the track; and when the vehicle has passed the location of the vehicle number reader, the vehicle number on the vehicle is read and at the same time the passage of the location by the vehicle and the vehicle speed of passage are detected. A result of this detection is transmitted to the automatic measuring apparatus of the present invention, which may be of such a constitution that the timing of entrance of the brake shoe of the vehicle into the field of view of the monitor camera is calculated on the basis of the time and speed of passage of the location of the serial vehicle number, and a trigger signal is outputted from the trigger detector at the timing thus calculated.

When the camera unit is provided with the above light source, the automatic measuring apparatus will be much more useful because night-time and dark-place photography is possible.

Although there is such a problem that it is difficult to see to which vehicle's brake shoe an image of a brake shoe photographed in the automatic measuring apparatus of the present invention corresponds. For the automatic measuring apparatus of the present invention, any kind of means capable of solving this problem may be adopted, and vehicle numbers may be manually inputted from for example a keyboard in the order of passage before or after photography by using for example the monitor camera. In this case, however, it is preferable that the whole system of the present invention be constituted such that for example the above-described vehicle number reader is installed at the upstream or downstream side of the automatic measuring apparatus of the present invention and further the above-described input means is provided for automatically inputting an information specifying a vehicle which passes.

In this case, where the brake shoes differ in location, shape, etc. for each vehicle, that information may be inputted through the input means when required, for example when starting the automatic measuring apparatus of the present invention, or a table of correspondence of each vehicle for that information may be stored in the automatic measuring apparatus of the present invention.

According to the above-described constitution of the automatic measuring apparatus of the present invention, it is possible to identify an image of a brake shoe photographed by the automatic measuring apparatus even if a change has been made in train composition.

Thickness history control of each brake shoe can be performed by a checker in accordance with information displayed on for example the display means described above. Furthermore, a memory means for storing the history of thickness of each brake shoe, if provided in the image processing unit, will become more convenient for analyzing for example the degree of wear of each brake shoe in relation to a distance and route of running of the vehicle and for checking the cause of excessive wear.

Furthermore, the warning means, when employed, will immediately give a warning about excessive wear, if any, thereby preventing an accident.

According to the present invention, as explained above, the condition of the brake shoe of a running railway vehicle is recorded as a static image, and image processing and wear measurement are carried out; visual checks so far practiced in the field are no more necessary. Such inspection work can be mechanized, thus eliminating inspection work to be conducted under unfavorable conditions.

Furthermore, since a history of results of measurements can be collected, it is possible to foresee the time of brake shoe replacement and perform checks and replacement as scheduled.

BEST MODE FOR CARRYING OUT THE INVENTION

Hereinafter the configuration of the automatic measuring apparatus of the present invention to be executed will be explained. Here will be described an example of detection of the thickness of a brake shoe 21 for a wheel tread shown in FIG. 13.

Figure 1:
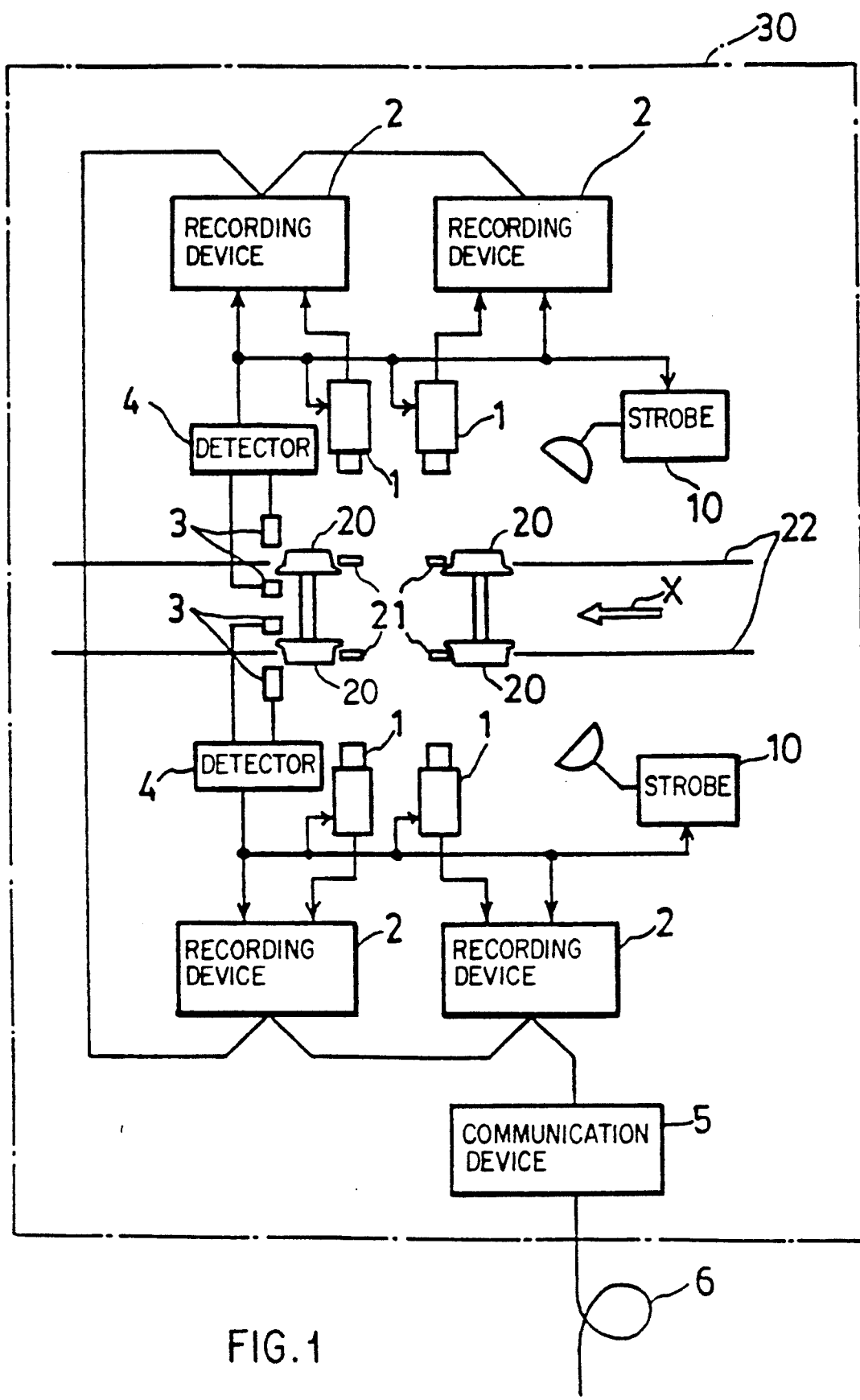
FIG. 1 is a block diagram of a camera unit included in one embodiment of an automatic brake shoe measuring apparatus for rolling stock according to the present invention.
Figure 2:
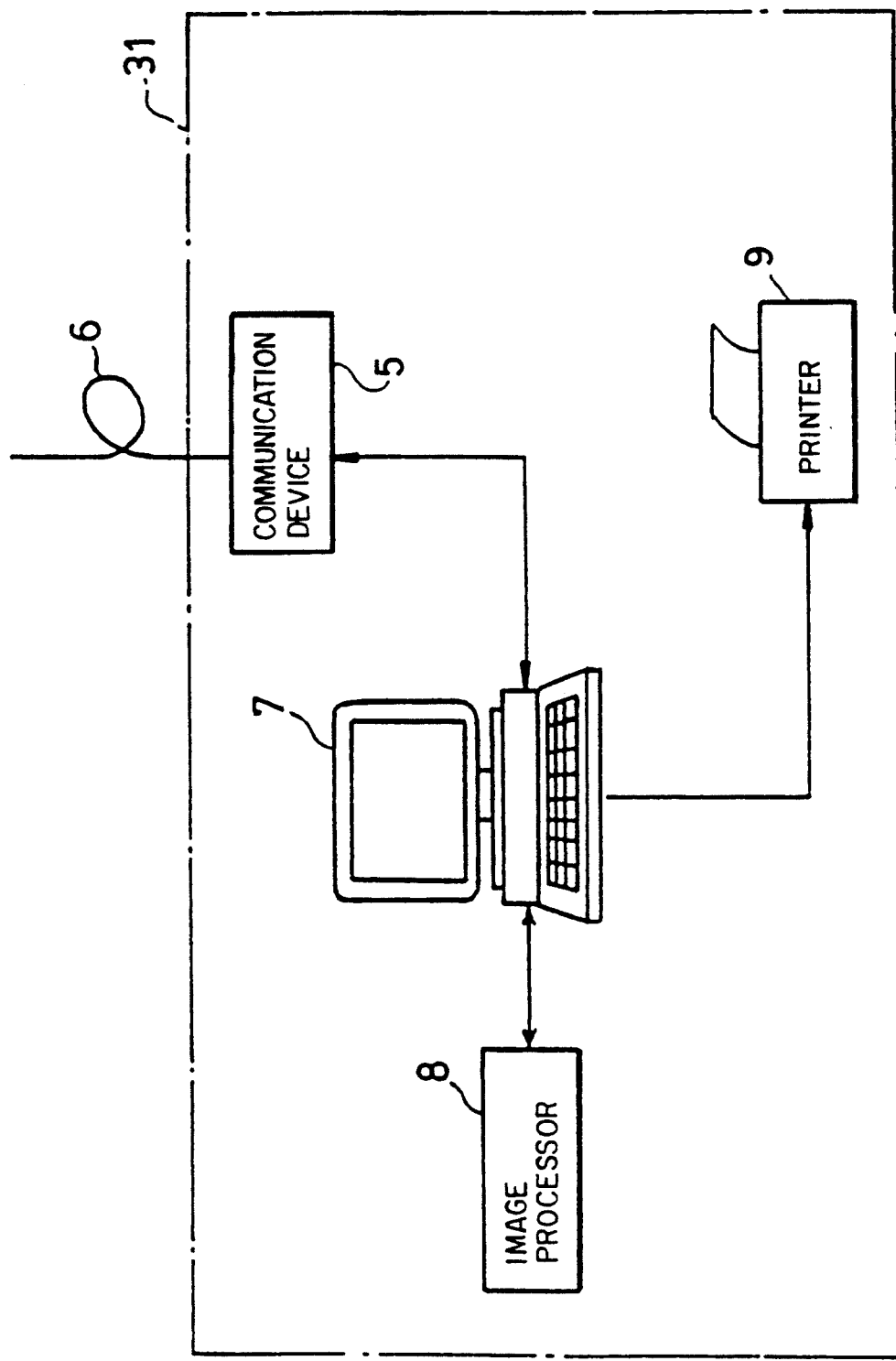
FIG. 2 is a block diagram of an image processing unit included in one embodiment of the automatic brake shoe measuring apparatus for rolling stock according to the present invention.

FIGS. 1 and 2 are the block diagrams of a camera and an image processing unit of one embodiment of the automatic measuring apparatus of brake shoes for a railway vehicle according to the present invention.

A wheel 20 of the vehicle runs in the direction of travel of the vehicle indicated by the arrow X on a track 22. The brake shoe 21 is used to apply a brake force to the wheel 20 and is an object of this measurement. In the present embodiment, one bogie has four wheels 20, each of which is provided with one brake shoe 21 for the wheel tread. A television camera 1 is used for photographing the brake shoe 21. An image recording device 2 is provided with an image memory of the present invention, which is capable of recording a plurality of static image data photographed by the television camera 1; and the image data thus recorded can be transferred to a computer and other devices through a built-in communication interface. Since, in the present embodiment, one bogie is equipped with four brake shoes 21, there are mounted four television cameras 1 and four image-recording devices 2 correspondingly to the four brake shoes 21. When, however, the number of the brake shoes 21 differs with the type of vehicle and bogie, the number of the television cameras 1 and the image recording devices 2 may be changed to the number of the brake shoes 21. When one television camera 1 is capable of photographing a plurality of brake shoes 21, the number of the television cameras 1 is not necessarily required to agree with the number of the brake shoes 21. A photo sensor 3 is an example of a sensor of the present invention which responds to the passage of the vehicle by a specific position on the track. It consists of a light emitting section and a light receiving section. When the wheel 20 has passed the position of the photo sensor 3, the entrance of light from the light emitting section into the light receiving section is interrupted, and the trigger detector 4 connected to the photo sensor outputs a trigger signal. The location of this photo sensor 3 is preset so that the brake shoe 21 will come into the angle of view of the television camera 1 the instant that the light being projected from the light emitting section is interrupted by the wheel 20. The trigger detector 4 gives off a shutter timing signal to provide the photographing timing of the brake shoe 21 to the television camera 1 by outputting the trigger signal, and timing signal for storing image signal is given to the image recording device 2, and at the same time gives off a light-emitting timing signal to a strobe light emitting device 10. That is, the photo sensor 3 and the trigger detector 4 detect the passage of the wheel 20, thus operating to give the shutter timing for reliably photographing the brake shoe 21 within the angle of view of the television camera 1. The strobe light emitting device 10 emits the light at the aforesaid shutter timing, enabling night-time and dark-place photography. This device, however, may be dispensed with where sufficient light for photography is available.

In the present embodiment of the automatic measuring apparatus of brake shoe for the wheel tread the camera unit 30 is installed partly in the vicinity of the track on which the vehicle runs and partly within the track. The automatic measuring apparatus for the disc-type brake shoe is also mounted in the similar position. In either type, however, the image recording device 2 or the trigger detector 4 and the image recording device 2 may be installed away from the track.

An optical data communication device 5 of the camera unit 30 and another optical data communication device 5 of the image processing unit 31 are interconnected with an optical fiber 6, through which the image data recorded in the image recording device 2 is transmitted by the optical data communication device 5 to a computer 7 shown in FIG. 2. A transmission line to be used here is not necessarily limited to optical fiber. In the case of a short physical distance between a camera unit 30 and an image processing unit 31, the image recording device 2 and the computer 7 may be directly connected, not via the optical data communication device 5. The computer 7 has a keyboard for entering information necessary for specifying vehicles, and functions to control the image recording device 2 for starting recording, to read a recorded image as data, to supply this data to an image processing device 8, to store a result of this processing in a memory region inside, and then to output the data to a printer 9.

Next, the mode of operation of the embodiment shown in FIG. 1 will be explained. When the wheel 20 of a train running in the direction of travel (the direction of the arrow X) on the track 22 has just passed the photo sensor 3, the trigger detector 4 produces a shutter timing signal, actuating the strobe light emitting device 10 to illuminate the brake shoe 21. At the same time, the shutter timing signal is inputted into the image recording device 2 and the television camera 1, so that when the timing signal is generated, that is, when the brake shoe 21 has entered the angle of view of the television camera 1, the image of this brake shoe 21 is sent as an image signal from the television camera 1 to the image recording device 2, which in turn takes in and stores the image signal.

The shutter timing signal from the trigger detector 4 is produced only when the wheel of an odd number has passed the photo sensor 3 in this example; and therefore, the image of the second brake shoe will be recorded in the image recording device 2 when the first wheel of the bogie has passed. In this manner the images of all brake shoes will be recorded in succession in the image recording device 2, and when all of the brake shoes of one train have been recorded, the image recording device 2 informs the computer 7 of the end of image recording, from the communication interface of the image recording device 2 through the optical data communication device 5 and the optical fiber 6. Then the computer 7 reads out the image data in order from the image recording device 2, while storing them. After storing all of the image data, the computer 7 extracts the image of only the brake shoe 21 by a method of extracting the image contour and configurative characteristics of the brake shoe 21, using an image processing program that has been prepared in advance and the image processing device 8, on the basis of image data of the brake shoe 21 that have been stored, and performs the measurements of residual thickness of the brake shoe 21 on the image. In the present embodiment, the computer 7 is connected to a host computer not illustrated, to which a vehicle number reader for reading vehicle numbers on vehicles is connected. Vehicle numbers that have been read by this vehicle number reader are inputted into the computer 7 via the host computer, thereby ascertaining to which vehicle the brake shoe photographed by the television camera 1 corresponds. The vehicle number reader may be directly connected to the computer 7 of the image processing unit 31 through the communication interface. The residual thickness of the brake shoe 21 of each vehicle measured as described above is stored in the storage region of the computer 7 so that the history of changes in the thickness of the brake shoe 21 may be traced back. This residual thickness will be displayed on the display of the computer 7 and outputted to the printer 9. When it has been judged that the result of measurement is less than the value of wear limit, a warning will appear on the display of the computer 7 and at the same time a buzzer will sound.

Figure 3:
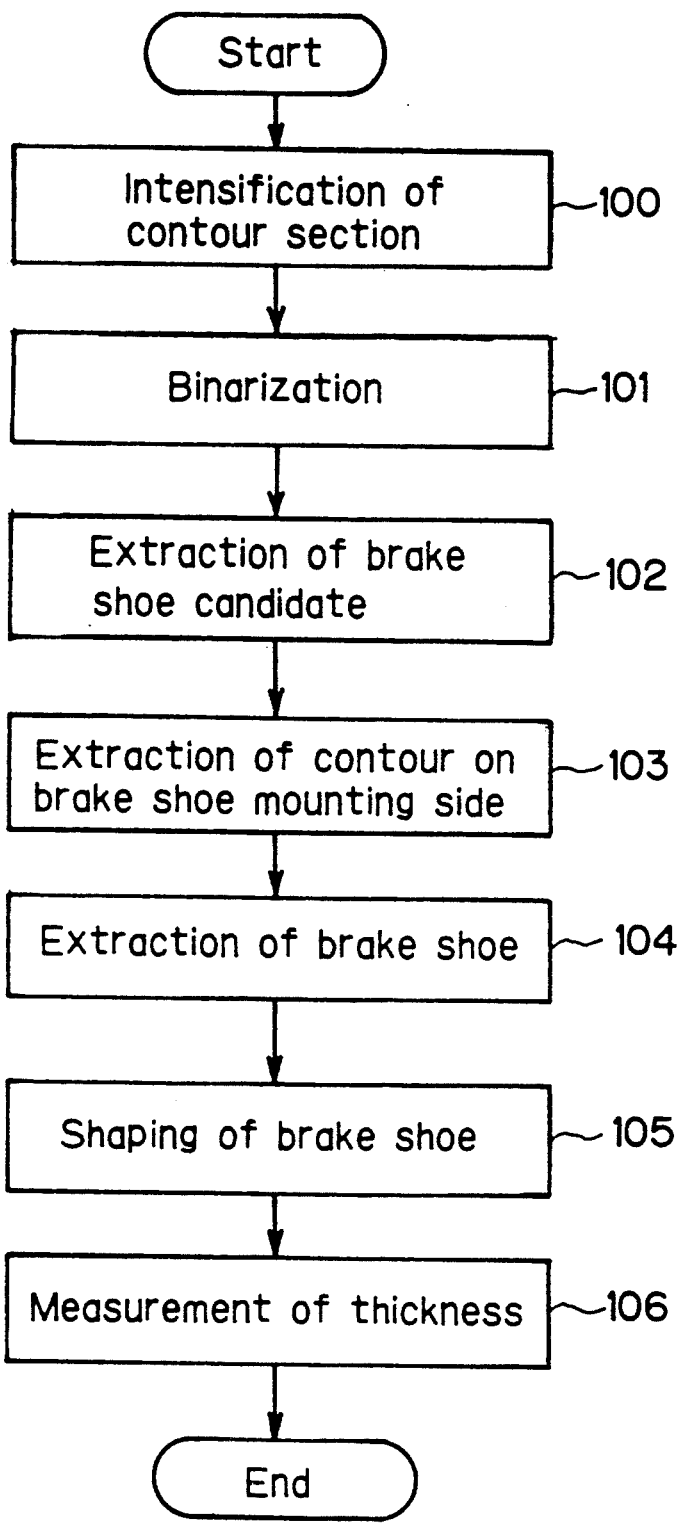
FIG. 3 is a flowchart showing the flow of image processing executed at the image processing unit.

FIG. 3 is a flowchart showing the flow of image processing to be executed at the image processing unit 31. In the present embodiment, Steps 100 to 104 in the flowchart correspond to the extracting means of the present invention, and Steps 105 and 106 correspond to the arithmetic means of the present invention.

Figure 4:
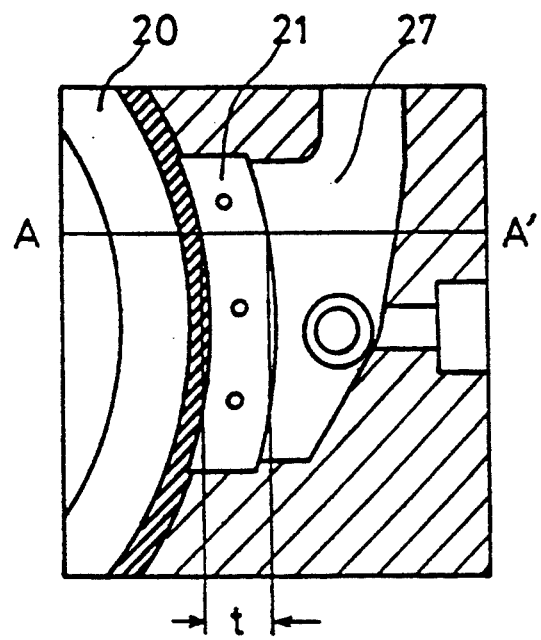
FIG. 4 is one example of an original image representing image data inputted into the image processing unit.
Figure 13:
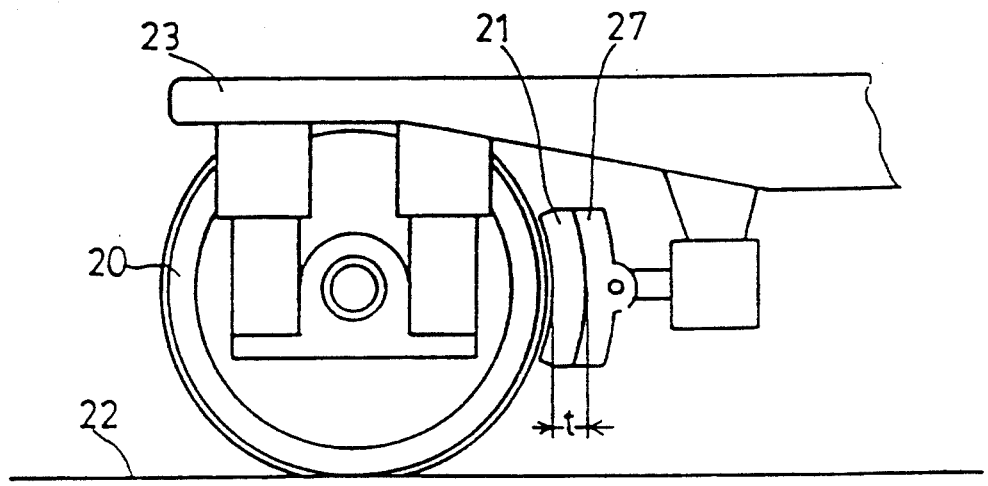
FIG. 13 is a typical view showing one example of the brake shoe of rolling stock.

FIG. 4 shows one example of an original image represented by an image data inputted into the image processing unit 31 through the optical fiber 6. It should be noted that in the original image in FIG. 4 the same parts or members as those in FIG. 13 are designated by the same reference numerals and symbols for purpose of simplification.

The image data representing the original image as illustrated is inputted into the image processing unit 31, where the contour of each part within the original image is first enhanced by enhancement processing (Step 100).

Figure 5:
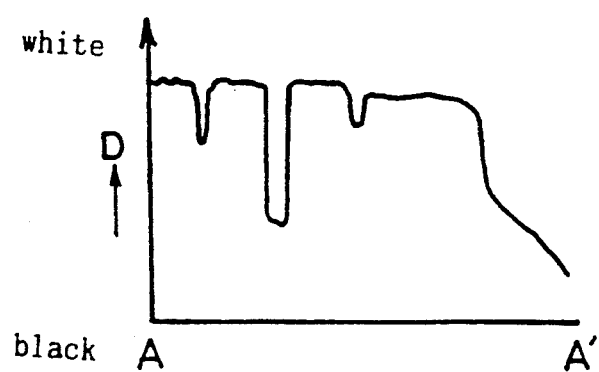
FIG. 5 is a view showing a profile of image data taken along line A—A' of the original image shown in FIG. 4.
Figure 6:
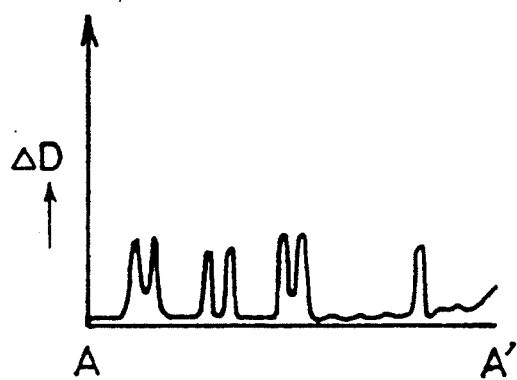
FIG. 6 is a view showing a profile of differential data obtained by differentiating the image data shown in FIG. 5.
Figure 7:
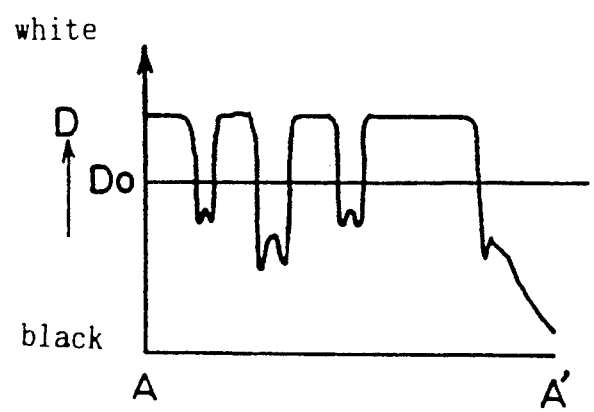
FIG. 7 is a view showing a profile of data obtained by subtracting the differential data shown in FIG. 6 from the image data shown in FIG. 5.

FIGS. 5, 6 and 7 show respectively a profile of brightness (density) of the image data taken along the line A—A' of the original image shown in FIG. 4, a differential profile thereof, and a profile of the image data shown in FIG. 5 minus the differential profile shown in FIG. 6.

At Step 100 the image data representing the original image shown in FIG. 5 is differentiated in the horizontal direction (the direction along the line A-A' of FIG. 4) of the original image, thereby obtaining a differential image data as shown in FIG. 6. Subsequently a contour-enhanced image data shown in FIG. 7 is obtained by subtracting the differential image data from the image data expressing the original image by each picture element corresponding to each other. Thus the contour section in the original image inclusive of the image of the brake shoe 21 is enhanced.

Figure 8:
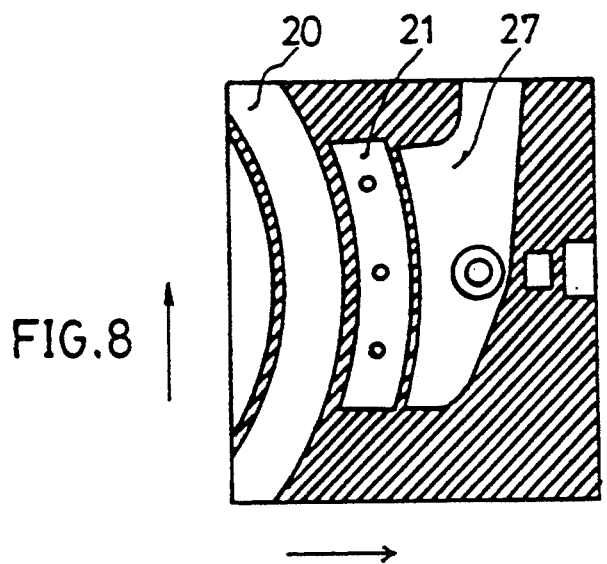
FIG. 8 is a view expressing a binary image corresponding to the original image of FIG. 4.

After the above contour enhancement processing, the contour-enhanced image data thus obtained through the contour-enhancement processing is binarized (Step 101) at a specific threshold value D0 (see FIG. 7), thereby producing a binary image data representing a binary image shown in FIG. 8. In this binary image also, the same parts as those in the original image shown in FIG. 4 are designated by the same reference numerals.

Figure 9:
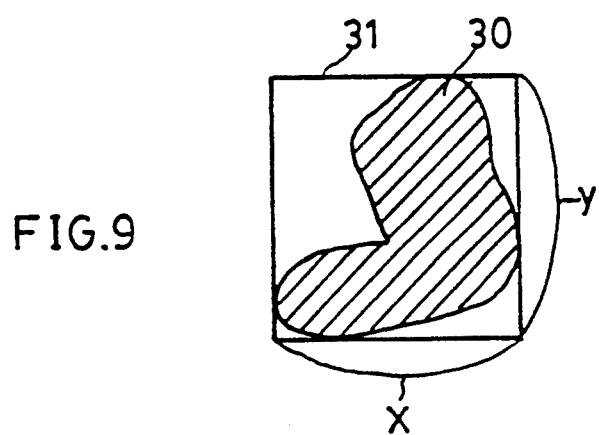
FIG. 9 is an explanatory view of a fillet diameter.

Next, at Step 102, the extraction of the candidate image of the brake shoe 21 is performed on the basis of the binary image data representing the binary image (FIG. 8). Here, therefore, the extraction is done of a binary image whose fillet diameter is close to the curvature of the brake shoe 21. The fillet diameter is meant by the dimensions in the directions x and y of a square 31 which is contiguous to the outside diameter of the FIG. 30 as shown in FIG. 9.

Figure 10:
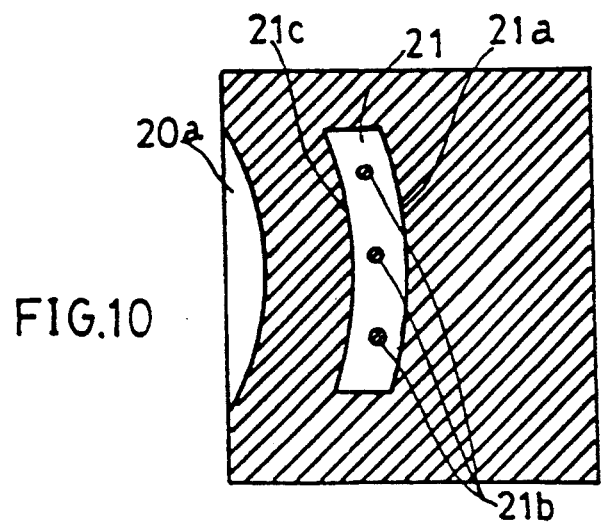
FIG. 10 is a view representing a candidate image of a brake shoe.

FIG. 10 is a view showing the proposed image 21 of the brake shoe extracted by the above-described procedure.

In this view both the image 21 of the brake shoe as a proposed image of the brake shoe and a partial image 20a of the wheel 20 have been extracted as a candidate of the brake shoe image.

Figure 11A:
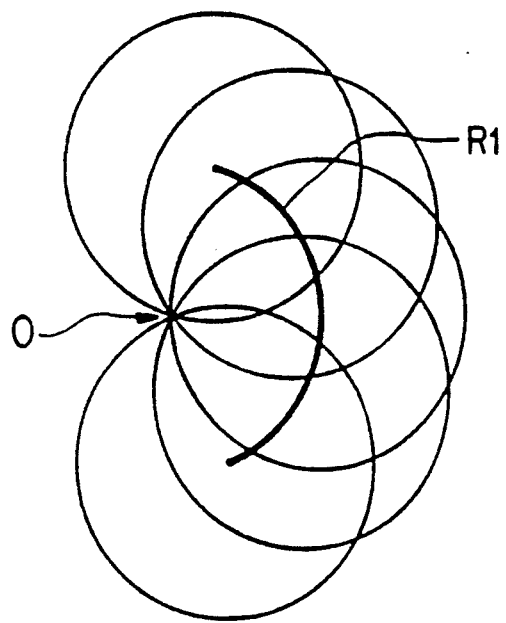
FIG. 11A and 11B are views representing the Hough transformation of a circle.
Figure 11B:
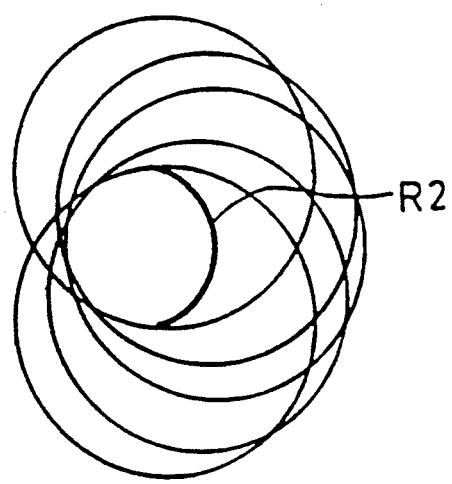

Subsequently, the Hough transformation of circle is effected in relation to the contour coordinate of the candidate of the brake shoe image extracted as described above, thereby extracting the contour of the image 21a (on the holder 27 side in FIG. 13) on the brake shoe mounting side (Step 103). The image 21a on the brake shoe mounting side has a fixed and known curvature, which will not vary even when the brake shoe is subjected to wear; therefore with the Hough transformation of circle, the highest value is obtained as a result of the transformation as compared with other contours, thus ascertaining the image 21a on the brake shoe mounting side. FIG. 11 is a view showing the mode of this Hough transformation of circle.

As shown in FIG. 11 a number of circles having the radius of curvature R1 of the image 21a on the brake shoe mounting side as a radius thereof are drawn on the center of each point on each contour of the image. At this time, when the center of each of a number of thus drawn circles having the radius R1 is present on the circular arc of the radius R1 as shown in FIG. 11 (A), loci of the circles are overlapped at the center 0 of the arcs of the radius R1, presenting a maximum integrated value of the overlapping frequency (quantity) of the loci at one point. On the other hand, when a number of circles having the radius R1 are drawn along the arcs of the radius R2 (R2≠R1) as shown in FIG. 11 (B), the loci of these circles are overlapped at one point and disperse at a lower frequency. The circular arc of the radius R1, that is, the contour of the image 21a on the brake shoe mounting side, can be detected by thus checking the integrated value of the overlapping frequency of the loci at one point.

With the detection of the contour of the image 21a on the brake shoe mounting side, the brake shoe 21 having this contour on the mounting side 21a is extracted (Step 104).

Next, the diagram is expanded to correct the shape of the brake shoe image 21 extracted as described above, thereby filling the holes 21b (see FIG. 10) present in the brake shoe; and then the diagram is reduced to the original size (Step 105).

Figure 12A:
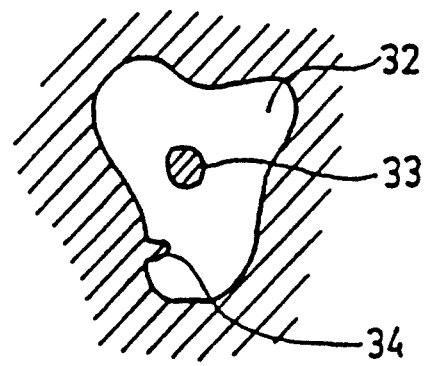
FIGS. 12A-12C are typical views representing the expansion and contraction of a diagram.
Figure 12B:
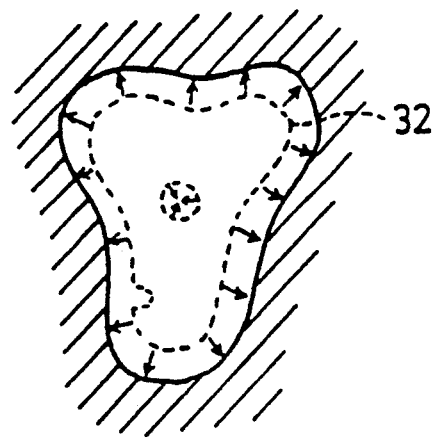
Figure 12C:
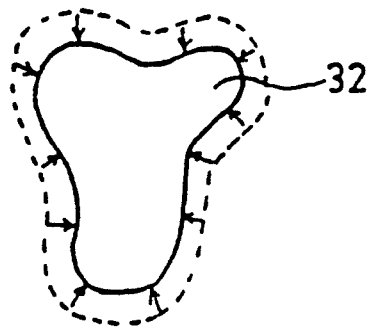

FIG. 12 is a typical view representing the expansion and contraction of the diagram.

Where there exist a hole 33 in the diagram 32 enclosed by a specific contour and a minute recess 34 in the outside contour of the diagram 32 as shown in FIG. 12(A), the diagram 32 is expanded as shown in FIG. 12(B). When, at this time, the hole 33 and the recess 34 are present, this expansion takes place also towards the center of the hole 33 and the recess 34. Consequently the hole 33 and the recess 34 will be absorbed to disappear by expanded diagram. Thereafter, as shown in FIG. 12(C), the diagram 32 is contracted to a well-shaped diagram 32 of the original size having neither the hole 33 nor the minute recess in the outside contour.

At Step 105, the diagram of the image 21 of the brake shoe extracted at Step 104 is expanded and contracted as described above, thereby providing a fine brake shoe image 21 without a recess in the outside shape and noise that has occurred in such a process as the binarization stated above.

Next, at Step 106, a distance between a point where a straight line passes the center of the contour (circular arc) of the image 21a on the brake shoe mounting side extracted as described above and a point where the straight line passes the center of the contour of the image 21c on the wheel side is determined in relation to a plurality of straight lines; from results of measurements of a plurality of distances thus obtained, a mean value is found. This mean value is the thickness t (see FIG. 4) of the image 21 of the brake shoe.

The thickness t thus determined is stored and displayed as previously stated, and then compared with a specific wear limit value; when the thickness t is less than the wear limit value, the buzzer will operate to give a warning.

Figure 14:
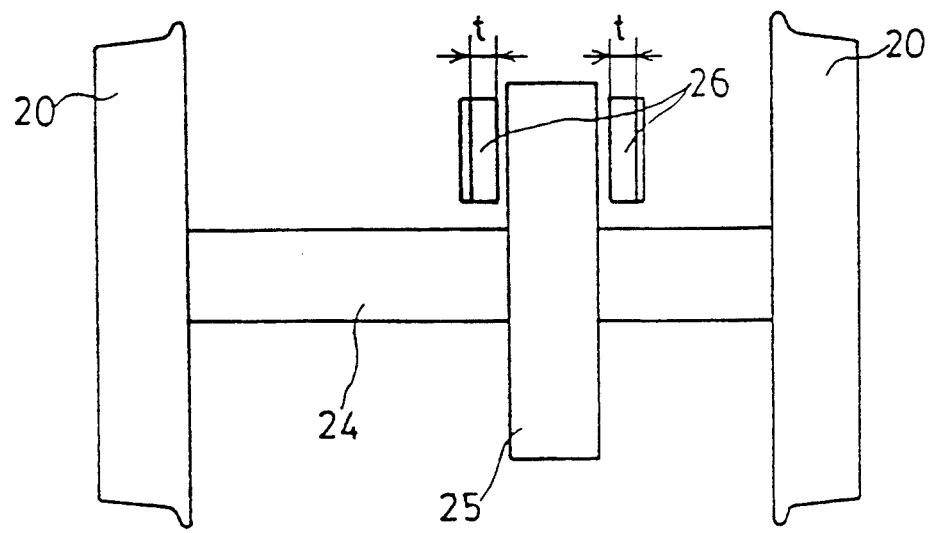
FIG. 14 is a typical view showing another example of the brake shoe of rolling stock.

The present embodiment described above gives an example of measurements of the thickness of the brake shoe 21 for the wheel tread (see FIG. 13); a disc brake shoe 26 (see FIG. 14) can be detected by adding a change for example by the Hough transformation of circle for straight line detection at Step 103 in FIG. 3.

In the above embodiment, the thickness t of the brake shoe 21 was displayed and at the same time a warning was given by the buzzer as a result of comparison of this thickness t with the wear limit value. In this case, however, whether or not the thickness t thus measured and displayed has reached the wear limit value may be judged by the operator. Since final information to be obtained is whether or not the thickness t has reached the wear limit value, the automatic measuring apparatus may be so constituted that the thickness t itself must not be displayed and only when the thickness t has exceeded the wear limit value, the decreased thickness of the brake shoe 21 will be displayed or warned of by the buzzer.

We claim:

1. An automatic brake shoe measuring apparatus for a railway vehicle, comprising:
   a camera unit including:
      monitor camera means for photographing at least one brake shoe on said railway vehicle during travel and for outputting an image signal of said at least one brake shoe;
      image memory means connected to said monitor camera means for storing the image signal;
      sensor means for detecting the passage of said vehicle over a position on a track and outputting an output signal upon detecting the passage of said vehicle; and
      trigger detector means connected to said monitor camera means for receiving the output signal from said sensor means and outputting a trigger signal to activate said monitor camera means; and
   an image processing unit connected to said camera unit including;
      an extraction means for extracting an image of said at least one brake shoe from the image signal stored in said image memory;
      an arithmetic means for determining the thickness of said at least one brake shoe from the image of said at least one brake shoe; and
      a display means for displaying the thickness of said at least one brake shoe.

2. The automatic brake shoe measuring apparatus as claimed in claim 1, wherein said camera unit further includes light source means for receiving said trigger signal and emitting a flashing light towards said at least one brake shoe at an instant that said at least one brake shoe is photographed by said monitor camera means.

3. The automatic brake shoe measuring apparatus as claimed in claim 1, wherein said image processing unit further includes input means for entering information that specifies the vehicle equipped with brake shoes to be photographed by said monitor camera means.

4. The automatic brake shoe measuring apparatus as claimed in claim 1, wherein said image processing unit further includes memory means for storing a history of thickness of said at least one brake shoe to show gradual wear of said at least one brake shoe.

5. The automatic brake shoe measuring apparatus as claimed in claim 1, wherein said image processing unit further includes decision means for determining whether the thickness of said at least one brake shoe determined by said arithmetic means is greater or less than a wear limit value and warning means for giving a warning when the thickness of said at least one brake shoe is less than said wear limit value.

6. An automatic brake shoe measuring apparatus for measuring a thickness of at least one brake shoe on a railway vehicle, comprising:
   a camera unit, including:
      a sensor that detects passage of said vehicle over a position on a track and generates an output signal indicative of passage of said vehicle;
      a trigger detector that receives said output signal from said sensor and outputs a trigger signal in response to said output signal;
      a monitor camera that photographs said at least one brake shoe to generate at least one image signal when said trigger signal is received from said trigger detector; and
      an image memory connected to said monitor camera that stores said at least one image signal; and
   an image processing unit connected to said camera unit, said image processing unit including:
      a computer that extracts at least one image of said at least one brake shoe from said at least one image signal;
      an image processing device connected to said computer that determines the thickness of said at least one brake shoe from said at least one image; and
      a display device connected to said computer that displays the thickness of said at least one brake shoe.

7. The automatic brake shoe measuring apparatus as claimed in claim 6, wherein said camera unit further includes a light source that receives said trigger signal and emits a flashing light towards said at least one brake shoe at an instant when said at least one brake shoe is photographed by said monitor camera.

8. The automatic brake shoe measuring apparatus as claimed in claim 6, wherein said computer includes an input device on which information specifying a vehicle equipped with brake shoes to be photographed by said monitor camera is entered.

9. The automatic brake shoe measuring apparatus as claimed in claim 6, wherein said image processing unit further includes a memory that stores a history of thickness of said at least one brake shoe.

10. The automatic brake shoe measuring apparatus as claimed in claim 6, wherein said image processing device further includes decision means for determining whether the thickness of said at least one brake shoe is less than a wear limit value and warning means for giving a warning when the thickness of said at least one brake shoe is less than said wear limit value.

11. A method of automatically determining a thickness of at least one brake shoe of a railway vehicle from an image of said at least one brake shoe fed to a computer, comprising the steps of:
   detecting with a sensor the passage of said moving railway vehicle over a position on a track;
   generating an output signal when the passage of said vehicle is detected by said sensor;
   feeding the output signal to a trigger detector to generate a trigger signal;
   photographing the at least one brake shoe with a camera in response to the trigger signal to generate at least one image signal;
   extracting at least one image of said at least one brake shoe form the at least one image signal;
   determining the thickness of said at least one brake shoe form the at least one image; and
   displaying the thickness of said at least one brake shoe on a display connected to said computer.

12. The method of claim 11, further comprising the step of emitting a flashing light towards said at least one brake shoe in response to said trigger signal when said at least one brake shoe is photographed by said monitor camera.

13. The method of claim 11, further comprising the step of inputting information to said computer, said information specifying a vehicle equipped with brake shoes to be photographed by said monitor camera.

14. The method of claim 11, further comprising the step of storing a history of thickness of said at least one brake shoe in said computer.

15. The method of claim 11, further comprising the steps of:
 determining whether the thickness of said at least one brake shoe is less than a specific wear limit value; and
 generating a warning when the thickness of said at least one brake shoe is less than said wear limit value.

* * * * *